United States Patent [19]
Dolan

[11] 3,765,467
[45] Oct. 16, 1973

[54] TIRE CHAIN MEANS
[76] Inventor: Thomas E. Dolan, 2568 Parkview Pl., Baldwin, N.Y.
[22] Filed: June 12, 1972
[21] Appl. No.: 262,144

[52] U.S. Cl. ............................... 152/219, 152/217
[51] Int. Cl. ........................................... B60c 27/06
[58] Field of Search ............... 152/213 A, 219, 222, 152/241

[56] References Cited
UNITED STATES PATENTS

| | | | |
|---|---|---|---|
| 2,436,709 | 2/1948 | Bozenhard et al. | 152/241 |
| 1,890,346 | 12/1932 | Tudhope | 152/222 |
| 2,553,849 | 5/1951 | Dines | 152/241 |
| 3,616,830 | 11/1971 | McGill | 152/213 A |
| 1,953,495 | 4/1934 | Nargi | 152/222 |

Primary Examiner—James B. Marbert
Assistant Examiner—Kenneth Noland
Attorney—James P. Malone

[57] ABSTRACT

A tire chain assembly comprising a belt adapted to extend around the tire. A plurality of chain links are integrally mounted on the belt. A first cable passes through the end links of said chains on one side of the tire. A second cable passes through the end links of said chains on the other side of said chains. A turnbuckle secures the ends of said cables when the belt and chain assembly is mounted on a tire.

2 Claims, 4 Drawing Figures

PATENTED OCT 16 1973

3,765,467

TIRE CHAIN MEANS

This invention relates to tire chains and more particularly to tire chains which are easy to mount on a vehicle wheel.

In the present invention, the assembly comprises a plurality of chains which are mounted on a belt or jacket for easy handling. The belt or jacket is adapted to be wrapped around the vehicle wheel. First and second cables pass through end links of the chains, the first cable being on the front side of the wheel and the second cable being on the rear side of the wheel. The cables are secured to a turnbuckle or other securing device which is mounted on the front side of the wheel. The assembly can be mounted on a vehicle wheel with all connections being made on the front side of the wheel. The assembly can be mounted on a wheel in a very short time without jacking up the vehicle.

In order to mount the assembly, the belt or jacket is draped around the wheel and thereby mounting all of the transverse chains across the outer periphery of the wheel with proper spacing. The securing cables are then connected to a turnbuckle or other securing means on the front of the wheel. If the assembly will not fit completely on the bottom of the wheel, the car may be rolled about one or two feet. Alternatively by eliminating one of the transverse chains at the bottom of the wheel the assembly may be mounted without moving the car or jacking up the car.

Accordingly, the principal object of the invention is to provide new and improved tire chain means.

Another object of the invention is to provide new and improved tire chain means which may be mounted in a very short period of time.

Another object of the invention is to provide new and improved tire chain means which may be mounted in a very short period of time having attachment means on the front of the wheel thereby eliminating the necessity for making attachments on the rear side of the wheels.

Another object of the invention is to provide new and improved tire chain means which may be placed on a wheel without jacking up the car.

Another object of the invention is to provide new and improved tire chain means which may be mounted without jacking up or rolling the car.

Another object of the invention is to provide new and improved tire chain means comprising, belt means adapted to extend around a tire, a plurality of chain links mounted on said belt, a first cable passing through the end links of said chains on one side, a second cable passing through the end links of said chains on the other side of said chains, and means to secure the ends of said cables when said belt and chain assembly is mounted on a tire.

These and other objects of the invention will be apparent from the following specifications and drawings, of which:

Figure 1:
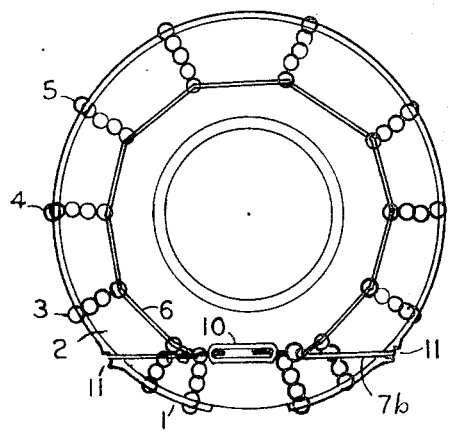
FIG. 1 is a front view of an embodiment of the invention mounted on a tire.

Referring to the Figures, the invention generally comprises a belt or jacket 1, which is adapted to extend around the tire 2. A plurality of chains, 3, 4, and 5,, etc. are mounted transversely on the belt 1, in generally parallel relationship. A first cable 6 passes through the end links of the chains of one end of the chains, except the two end chains. A second cable 7 passes through the end links of the other end of the chains. The cable 7 is the rear cable and its extensions 7a and 7b extend around the tire to the front of the tire where the ends are connected to turnbuckle 10. The ends of the front cable 6 are also connected to the turnbuckle. The ends of the cable 6 are permanently connected to the eye members of the turnbuckle and the ends of the cable 7 have snap on hooks 7c and 7d to attach to the eye members of the turnbuckle. The cables are integrally connected to belt 1, by molding into one piece or they may be connected by metal fasteners such as nuts and bolts, 15 and 16, connecting to extensions 1a and 1b of belt 1.

Figure 2:
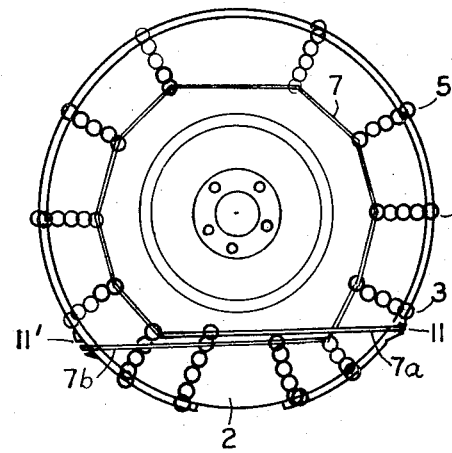
FIG. 2 is a rear view of the embodiment of FIG. 1.
Figure 4:
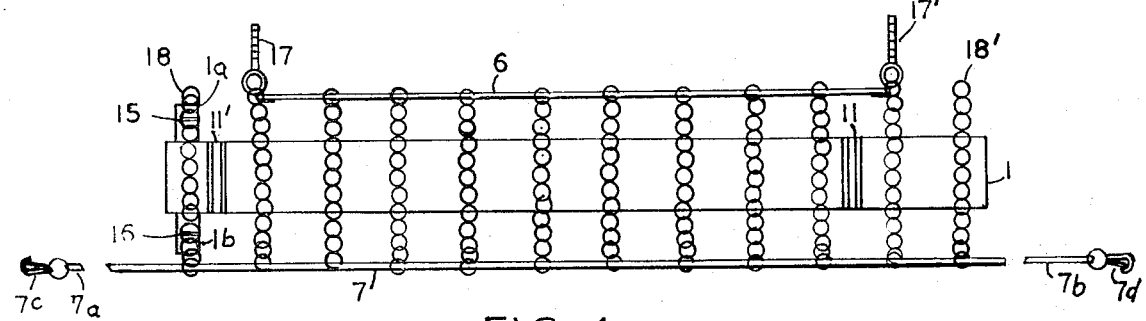
FIG. 4 is a view of the embodiment of FIG. 1 laid out flat.
Figure 3:
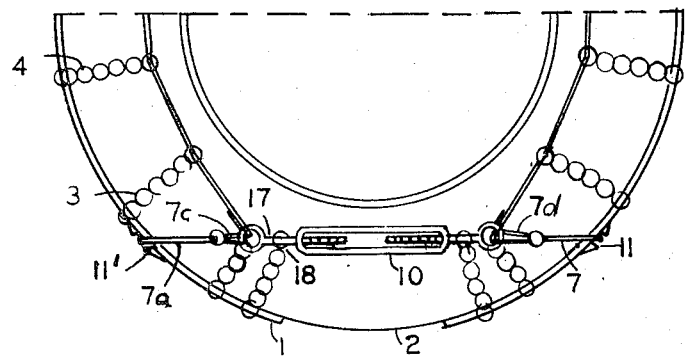
FIG. 3 is a detail view showing the turnbuckle securing mechanism.

FIG. 2 shows a rear view of the invention mounted on a tire. The end 7a of the cable 7, passes around the tire through a slotted buffer 11 connected to the belt 1 and the end 7b of the cable 7 passes around the tire through a similar slotted buffer 11' on the other side.

In order to mount the assembly on the tire the belt is draped around the top of the wheel. The chains will be uniformly spaced since they are integrally connected to the belt. The ends of the front cable 6 are then attached to the turnbuckle. The pins, 17, 17' are passed through the loops 18, 18' before being inserted into the turnbuckle 10. The ends of the rear cable 7 are then passed around to the front of the vehicle and attached to the turnbuckle. The turnbuckle 10 is then tightened up to secure the assembly in place. The turnbuckle has reverse threads at one end so that when it turns in one direction it tightens up the assembly. The cables may be of the type used for airplane strut cable and preferably have sufficient flexibility for wrapping around the tire.

If the full set of chains is used it will be necessary to roll the car one or two feet in order to get the bottom chains under the wheel. However, if one or two chains are omitted from the bottom section it will not be necessary to move the car and in no event is it necessary to jack up the vehicle.

Therefore, the advantages of the present invention are as follows:

Easily mounted on a tire in a short period of time. The total time lapse in putting this thing on the tire was less than two minutes, and with a properly engineered device I envision less than one minute.

The attachment mechanism is all worked from the front of the tire eliminating the necessity of going underneath the car for any additional attachments.

The mechanism is put onto the tire without jacking the car or even with one or two chains omitted at the bottom, without rolling the car forward.

Relatively inexpensive.

The dissassembly and storage could be accomplished at will with a very modest time lapse.

The cable extensions 7a and 7b, which wrap around the outside of the tire may b made of chains, if desired.

I claim:

1. Tire chain means comprising,
   belt means adapted to extend around a tire,
   a plurality of chains mounted transversley on said belt,
   a first outside cable connected to the ends of said chains on one side of said belt means,
   a second inside cable connected to the ends of said chains on the other side of said belt means, and means to secure the ends of said cables when said belt and chain assembly is mounted on a tire, comprising a turnbuckle, connected to said outside cable, said turnbuckle being mounted on the front face of the tire,, and the cable on the rear of the tire passing around said tire, and means to connect said inside cable to said turnbuckle whereby both inside and outside cables are tightened by said turnbuckle.

2. Apparatus as in claim 1 having buffer means on said belt means to protect said cables passing from the rear to the front of said tire.

* * * * *